United States Patent
Michikoshi et al.

(10) Patent No.: US 9,550,492 B2
(45) Date of Patent: Jan. 24, 2017

(54) VEHICLE CONTROL DEVICE

(75) Inventors: Yosuke Michikoshi, Miyoshi (JP); Shingo Eto, Gamagori (JP); Yuji Inoue, Nisshin (JP); Yukihiko Ideshio, Nisshin (JP); Akihiro Sato, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 69 days.

(21) Appl. No.: 14/384,311

(22) PCT Filed: Mar. 21, 2012

(86) PCT No.: PCT/JP2012/057212
§ 371 (c)(1),
(2), (4) Date: Dec. 16, 2014

(87) PCT Pub. No.: WO2013/140554
PCT Pub. Date: Sep. 26, 2013

(65) Prior Publication Data
US 2015/0149009 A1    May 28, 2015

(51) Int. Cl.
*B60W 20/00*    (2016.01)
*B60K 6/48*    (2007.10)
(Continued)

(52) U.S. Cl.
CPC ............ *B60W 20/00* (2013.01); *B60K 6/48* (2013.01); *B60W 10/02* (2013.01); *B60W 10/06* (2013.01); *B60W 10/08* (2013.01); *B60W 20/40* (2013.01); *B60K 2006/4825* (2013.01); *Y02T 10/6221* (2013.01); *Y02T 10/6252* (2013.01); *Y02T 10/6286* (2013.01)

(58) Field of Classification Search
CPC .......... B60W 20/00; B60W 10/02; B60K 6/48
See application file for complete search history.

(56) References Cited

U.S. PATENT DOCUMENTS 6,317,665 B1    11/2001 Tabata et al.
2010/0250037 A1    9/2010 Yoshida et al.
(Continued)

FOREIGN PATENT DOCUMENTS

CN    102300759 A    12/2011
JP    2000-120858 A    4/2000
(Continued)

*Primary Examiner* — Basil T Jos
(74) *Attorney, Agent, or Firm* — Sughrue Mion, PLLC (57) ABSTRACT

A control device of a vehicle includes an engine, an electric motor, and a first clutch connecting/disconnecting a power transmission path between the engine and the electric motor, and a second clutch configured to achieve a mechanically directly-coupled state of a power transmission path between the engine/the electric motor and drive wheels, the control device of a vehicle increasing a torque of the electric motor and causing the second clutch to slip-engage when the engine is started by controlling the first clutch toward engagement during motor running using only the electric motor as a drive force source for running with the first clutch released and the second clutch engaged, when the torque of the electric motor increased at the start of the engine relative to the torque of the electric motor during the motor running is larger, a slip amount of the second clutch being made larger as compared to when the torque is smaller.

6 Claims, 6 Drawing Sheets

(51) Int. Cl.
  *B60W 10/02* (2006.01)
  *B60W 10/06* (2006.01)
  *B60W 10/08* (2006.01)

(56) References Cited

U.S. PATENT DOCUMENTS

2012/0247911 A1* 10/2012 Noda .................. B60L 3/0023
  192/113.32
2013/0158766 A1 6/2013 Okuda

FOREIGN PATENT DOCUMENTS

| JP | 2010-167885 A | 8/2010 |
| JP | 2011-201415 A | 10/2011 |
| JP | 2011-219024 A | 11/2011 |
| JP | 2011-235818 A | 11/2011 |
| WO | 2012-011495 A1 | 1/2012 |

* cited by examiner

VEHICLE CONTROL DEVICE

CROSS REFERENCE TO RELATED APPLICATIONS

This application is a National Stage of International Application No. PCT/JP2012/057212 filed Mar. 21, 2012, the contents of all of which are incorporated herein by reference in their entirety.

TECHNICAL FIELD

The present invention relates to a control device of a vehicle including a first clutch connecting/disconnecting a power transmission path between an engine and an electric motor and a second clutch capable of achieving a mechanically directly-coupled state of a power transmission path between the engine/the electric motor and drive wheels.

BACKGROUND ART

A vehicle is well-known that includes an engine, an electric motor, and a clutch (also referred to as a direct clutch) capable of achieving a mechanically directly-coupled state of a power transmission path between the engine/the electric motor and drive wheels. It is proposed that if a pull-in (drop) of drive torque occurs in such a vehicle when the engine is started during motor running using only the electric motor as a drive force source for running, torque of the electric motor is increased to suppress an engine start shock due to the pull-in. For example, this corresponds to a vehicle described in Patent Document 1. Patent Document 1 discloses that, in a control device of a vehicle including an engine, an electric motor, and a torque converter with a lockup clutch disposed between the engine and drive wheels, when the torque of the electric motor is increased at the engine start from the motor running, the lockup clutch is slip-engaged depending on a margin torque, i.e., a difference between the maximum torque that can be output by the electric motor and a generated torque of the electric motor during the motor running, so as to more advantageously alleviate the engine start shock. Specifically, Patent Document 1 discloses that, if the torque of the electric motor is increased at the engine start from the motor running, a slip amount of the lockup clutch is made smaller when the margin torque of the electric motor (i.e., an available torque increase amount) is larger. In particular, in the technique described in Patent Document 1, when the margin torque of the electric motor is relatively larger, the pull-in at the engine start can sufficiently be compensated by the electric motor and, therefore, the slip amount of the lockup clutch is made smaller and, when the margin torque is relatively smaller, the slip amount of the lockup clutch is made larger to alleviate the engine start shock.

PRIOR ART DOCUMENT

Patent Document

Patent Document 1: Japanese Laid-Open Patent Publication No. 2011-235818

SUMMARY OF THE INVENTION

Problem to be Solved by the Invention

It is proposed that the vehicle as described above includes a connecting/disconnecting clutch separating an engine from a power transmission system during the motor running. In a vehicle including such a connecting/disconnecting clutch, if the engine is started by controlling the connecting/disconnecting clutch toward engagement, a torque going toward the engine via the connecting/disconnecting clutch (in other words, a torque capacity of the connecting/disconnecting clutch at the engine start) appears as a drop in drive torque. It is also proposed that, when the engine is started, a changing form of torque of the connecting/disconnecting clutch is determined based on a state of the engine (e.g., engine friction torque) varying with oil temperature etc., and an engine start time differing depending on a factor requesting the engine start. To suppress the drop in the drive torque at the engine start by increasing the torque of the electric motor to perform torque compensation for compensating the torque of the connecting/disconnecting clutch, the torque of the connecting/disconnecting clutch and the electric motor torque to be increased (hereinafter referred to as an electric motor compensation torque) must be made coincident. However, actual torque of the connecting/disconnecting clutch (hereinafter referred to as actual connecting/disconnecting clutch torque) may not correctly be estimated due to variations of components, variations of control, etc. As a result, a gap may occur in rising timing or absolute value between the actual connecting/disconnecting clutch torque and the electric motor compensation torque and, even if the torque compensation is performed by the electric motor, the drive torque may vary, resulting in the engine start shock. In this regard, when the engine is started, a direct clutch (corresponding to the lockup clutch of Patent Document 1) disposed between the engine/the electric motor and drive wheels can be slip-engaged to suppress the engine start shock even if a gap occurs between the actual connecting/disconnecting clutch torque and the electric motor compensation torque. In this case, if a slip amount of the direct clutch is uniformly set in expectation of the gap, fuel efficiency may deteriorate because a loss always occurs due to a slip of the direct clutch, or drivability (e.g., responsiveness of drive force to a drive request amount; power performance) may decrease because of the time required until subsequent reengagement of the direct clutch. Although the slip amount of the direct clutch is not uniformly set in the technique described in Patent Document 1, the slip amount of the lockup clutch is made smaller when the torque increase amount of the electric motor is larger and, therefore, if the technique of Patent Document 1 is employed, when a gap occurs between the actual connecting/disconnecting clutch torque and the electric motor compensation torque, the engine start shock may actually increase. The problem as described above is unknown and no proposal has hitherto been made on improving fuel efficiency or drivability while suppressing the engine start shock at the engine start performed by controlling the connecting/disconnecting clutch toward engagement during the motor running with the connecting/disconnecting clutch released and the direct clutch engaged.

The present invention was conceived in view of the situations and it is therefore an object of the present invention to provide a control device of a vehicle capable of satisfying both suppression of engine start shock and improvement in fuel efficiency or drivability when an engine is started by controlling a first clutch toward engagement during motor running with the first clutch released and a second clutch engaged.

Means for Solving the Problem

To achieve the object, the first aspect of the invention provides a control device of a vehicle including (a) an engine, an electric motor, and a first clutch connecting/ disconnecting a power transmission path between the engine and the electric motor, and a second clutch configured to achieve a mechanically directly-coupled state of a power transmission path between the engine/the electric motor and drive wheels, the control device of a vehicle increasing a torque of the electric motor and causing the second clutch to slip-engage when the engine is started by controlling the first clutch toward engagement during motor running using only the electric motor as a drive force source for running with the first clutch released and the second clutch engaged, wherein (b) when the torque of the electric motor increased at the start of the engine is larger, a slip amount of the second clutch is made larger as compared to when the torque is smaller.

Effects of the Invention

Consequently, although when the torque of the electric motor increased at the start of the engine (hereinafter referred to as an electric motor increase torque at the engine start) is larger, a larger gap tends to occur in rising timing or absolute value between the electric motor increase torque and a torque of the first clutch and the engine start shock generated due to the gap becomes larger as compared to when the torque is smaller, the slip amount of the second clutch is made larger to suppress the occurrence of the engine start shock. On the other hand, when the electric motor increase torque is relatively smaller, since a larger gap hardly occurs in rising timing or absolute value between the electric motor increase torque and the torque of the first clutch and, even if the gap occurs, the generated engine start shock is originally smaller, the slip amount of the second clutch can be made relatively smaller to ensure fuel efficiency or drivability. Therefore, when the engine is started by controlling the first clutch toward engagement during the motor running with the first clutch released and the second clutch engaged, both the suppression of the engine start shock and the improvement in fuel efficiency or drivability can be satisfied.

The second aspect of the invention provides the control device of a vehicle recited in the first aspect of the invention, wherein a fluid transmission device is disposed in the power transmission path between the engine/the electric motor and the drive wheels, and wherein the second clutch is a lockup clutch configured to directly couple an input-side rotating member and an output-side rotating member of the fluid transmission device. Consequently, since the fluid transmission device transmits power even if the lockup clutch is caused to slip, a reduction in drive force (having the same meaning as drive torque etc) is suppressed even if a slip amount of the lockup clutch is made larger at the engine start. Therefore, as compared to uniformly setting the slip amount of the lockup clutch at the engine start, for example, both the suppression of the engine start shock and the improvement in fuel efficiency or drivability can effectively be satisfied.

The third aspect of the invention provides the control device of a vehicle recited in the first aspect of the invention, wherein an automatic transmission is disposed that makes up a portion of the power transmission path between the electric motor and the drive wheels, and wherein the second clutch is an engagement device included in the automatic transmission. Consequently, as compared to uniformly setting a slip amount of the engagement device at the engine start, for example, both the suppression of the engine start shock and the improvement in fuel efficiency or drivability can be satisfied.

The fourth aspect of the invention provides the control device of a vehicle recited in any one of the first to third aspects of the invention, wherein a starter motor cranking the engine is further included, and wherein when the starter motor is used at the start of the engine, the electric motor increase torque at the engine start is made smaller as compared to when the starter motor is not used. Consequently, if the starter motor is used at the start of the engine, since the generated engine start shock is originally made smaller and the slip amount of the second clutch is made relatively smaller, fuel efficiency and drivability are ensured. Since the engine is started after certainly determining whether the starter motor is used based on a cooling water temperature, the amount of supply electric power, the number of times of operation, etc., in another viewpoint, the engine start shock is not deteriorated by making the slip amount of the second clutch smaller.

The fifth aspect of the invention provides the control device of a vehicle recited in any one of the first to fourth aspects of the invention, wherein a start control portion is further included that injects and explodes fuel in a cylinder of the engine during stop of rotation to start the engine, and wherein when an engine start is performed by the start control portion at the start of the engine, the torque of the electric motor increased at the start of the engine is made smaller as compared to when the engine start is not performed by the start control portion. Consequently, if the engine start is performed by the start control portion at the start of the engine, since the generated engine start shock is originally made smaller and the slip amount of the second clutch is made relatively smaller, fuel efficiency and drivability are ensured. Since the engine is started after certainly determining whether the engine start can be performed by the start control portion based on a rotation stop position of the engine (crank angle during stop of the engine rotation) etc, in another viewpoint, the engine start shock is not deteriorated by making the slip amount of the second clutch smaller.

MODE FOR CARRYING OUT THE INVENTION

In the present invention, preferably, the automatic transmission is made up of an automatic transmission having the fluid transmission device, or an automatic transmission having an auxiliary transmission. This automatic transmission is made up of a known planetary gear automatic transmission having rotating elements of a plurality of sets of planetary gear devices selectively coupled by engagement devices to achieve a plurality of gear stages in an alternative manner; a synchronous meshing type parallel two-shaft automatic transmission that is a synchronous meshing type parallel two-shaft transmission including pairs of always meshing change gears between two shafts and that has gear stages automatically switched by a hydraulic actuator; a so-called DCT (Dual Clutch Transmission) that is a synchronous meshing type parallel two-shaft automatic transmission and that is of a type having two systems of input shafts; a so-called belt type continuously variable transmission and a so-called toroidal type continuously variable transmission having gear ratios varied continuously in a stepless manner, etc. The second clutch is assumed to be the lockup clutch as well as the engagement device involved with a shift of the automatic transmission, an input clutch of the automatic transmission, an engagement device making up a forward/backward switching device included along with the continuously variable transmission, etc.

Preferably, for example, an internal combustion engine such as a gasoline engine and a diesel engine generating power from combustion of fuel is widely used as the engine. Preferably, wet type or dry type of engagement device is used as the first clutch.

An example of the present invention will now be described in detail with reference to the drawings.

EXAMPLE

Figure 1:
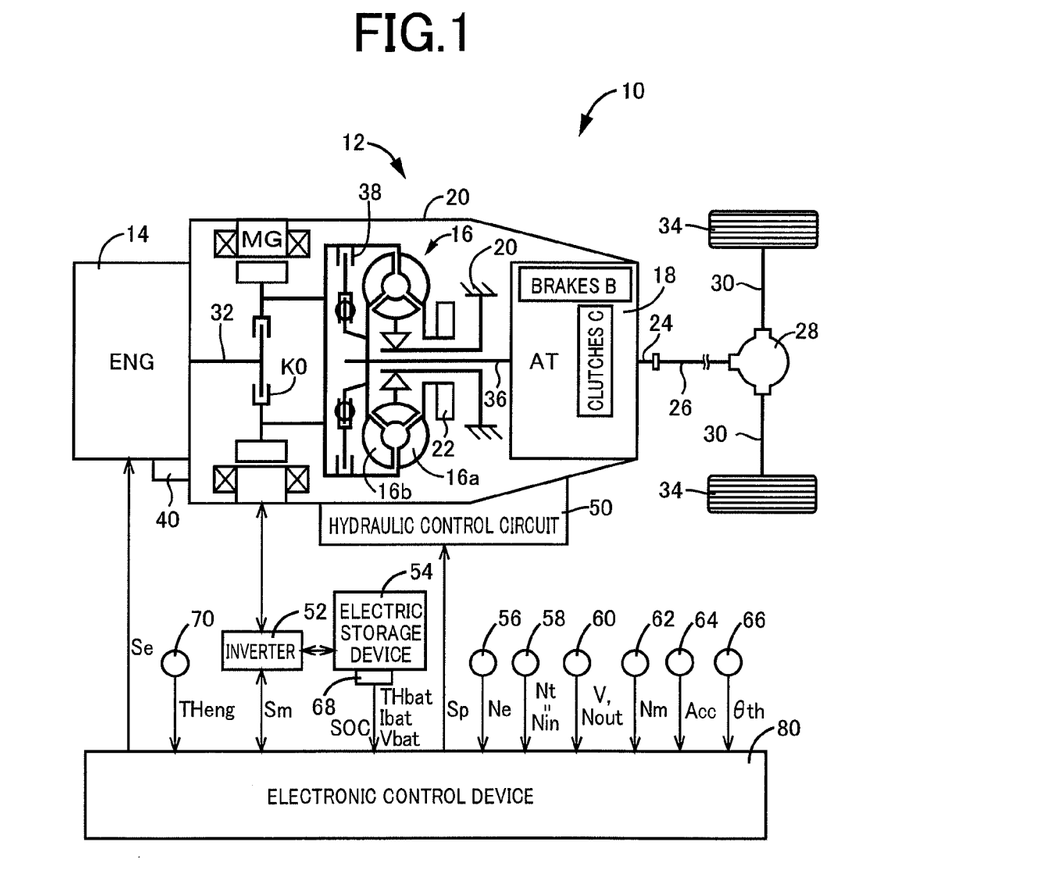
FIG. 1 is a diagram for explaining a general configuration of a power transmission path making up a vehicle to which the present invention is applied, and is a diagram for explaining a main portion of a control system disposed in the vehicle.

FIG. 1 is a diagram for explaining a general configuration of a power transmission path from an engine 14 to drive wheels 34 making up a vehicle 10 to which the present invention is applied, and is a diagram for explaining a main portion of a control system disposed in the vehicle 10 for output control of the engine 14, shift control of an automatic transmission 18, drive control of an electric motor MG, etc. In FIG. 1, the vehicle 10 is a hybrid vehicle including the engine 14 and the electric motor MG acting as drive force sources for running. A power transmission device 12 includes in a transmission case 20 acting as a non-rotating member, in order from the engine 14 side, an engine connecting/disconnecting clutch K0 (hereinafter referred to as a connecting/disconnecting clutch K0), a torque converter 16, and the automatic transmission 18. The power transmission device 12 also includes a propeller shaft 26 coupled to a transmission output shaft 24 that is an output rotating member of the automatic transmission 18, a differential gear 28 coupled to the propeller shaft 26, a pair of axles 30 coupled to the differential gear 28, etc. The power transmission device 12 configured as described above is preferably used in the vehicle 10 of the FR (front-engine rear-drive) type, for example. In the power transmission device 12, if the connecting/disconnecting clutch K0 is engaged, power of the engine 14 is transmitted from an engine coupling shaft 32 coupling the engine 14 and the connecting/disconnecting clutch K0, sequentially through the connecting/disconnecting clutch K0, the torque converter 16, the automatic transmission 18, the propeller shaft 26, the differential gear 28, the pair of the axles 30, etc., to a pair of the drive wheels 34.

The torque converter 16 is a fluid transmission device transmitting power (having the same meaning as torque and force if not particularly distinguished) input to a pump impeller 16a that is an input-side rotating member, from a turbine impeller 16b that is an output-side rotating member coupled to a transmission input shaft 36 via fluid toward the automatic transmission 18. The torque converter 16 includes a known lockup clutch 38 directly coupling the pump impeller 16a and the turbine impeller 16b. Therefore, the lockup clutch 38 is a second clutch capable of achieving a mechanically directly-coupled state of a power transmission path between the engine 14/the electric motor MG and the drive wheels 34. An oil pump 22 coupled to the pump impeller 16a is a mechanical oil pump rotationally driven by the engine 14 (or the electric motor MG) to generate an operating oil pressure for providing the shift control of the automatic transmission 18. The lockup clutch 38 is subjected to engagement/release control by a hydraulic control circuit 50 disposed on the vehicle 10 by using an oil pressure generated by the oil pump 22 as an original pressure.

The electric motor MG is a so-called motor generator having a function of a motor generating mechanical power from electric energy and a function of an electric generator generating electric energy from mechanical energy. The electric motor MG acts as a drive force source for running generating power for running instead of the engine 14 that is a power source or along with the engine 14. The electric motor MG also performs operations such as generating electric energy through regeneration from the power generated by the engine 14 or a driven force input from the side of the drive wheels 34 to accumulate the electric energy via an inverter 52 into an electric storage device 54. The electric motor MG is coupled to a power transmission path between the connecting/disconnecting clutch K0 and the torque converter 16 (i.e., operatively coupled to the pump impeller 16a) and power is mutually transmitted between the electric motor MG and the pump impeller 16a. Therefore, the electric motor MG is coupled to the transmission input shaft 36 that is an input rotating member of the automatic transmission 18 in a power transmittable manner as is the case with the engine 14.

The connecting/disconnecting clutch K0 is a wet multi-plate type hydraulic friction engagement device in which a plurality of friction plates overlapped with each other is pressed by a hydraulic actuator, for example, and is subjected to engagement/release control by the hydraulic control circuit 50 by using an oil pressure generated by the oil pump 22 as an original pressure. In the engagement/release control, a torque capacity of the connecting/disconnecting clutch K0 is varied, for example, continuously, through pressure adjustment of a linear solenoid valve etc., in the hydraulic control circuit 50. In an engaged state of the connecting/disconnecting clutch K0, the pump impeller 16a and the engine 14 are integrally rotated via the engine coupling shaft 32. On the other hand, in a released state of the connecting/disconnecting clutch K0, power transmission between the pump impeller 16a and the engine 14 is interrupted. Since the electric motor MG is coupled to the pump impeller 16a, the connecting/disconnecting clutch K0 is a first clutch connecting/disconnecting power transmission path between the engine 14 and the electric motor MG.

The automatic transmission 18 is coupled to the electric motor MG without via the connecting/disconnecting clutch K0 in a power transmittable manner and makes up a portion of the power transmission path from the engine 14 and the electric motor MG to the drive wheels 34 to transmit the power from the drive force source for running (the engine 14 and the electric motor MG) toward the drive wheels 34. The automatic transmission 18 is a known planetary gear type multistage transmission including a plurality of hydraulic friction engagement devices such as clutches C and brakes B as engagement devices, for example, and having a plurality of shift stages (gear stages) selectively established through a shift made by engagement and release of the hydraulic friction engagement devices. In the automatic transmission 18, each of the hydraulic friction engagement devices is subjected to the engagement/release control by the hydraulic control circuit 50 to establish a predetermined gear stage depending on driver's accelerator operation, a vehicle speed V, etc.

The vehicle 10 further includes a starter motor 40 that is a known engine starting motor cranking the engine 14. At the engine start by the starter motor 40, for example, after rotation speed of the engine 14 in a rotation stop state is raised to a predetermined rotation speed enabling a complete explosion, the engine 14 is started by initiating engine ignition, fuel supply, etc.

The vehicle 10 includes an electronic control device 80 including a control device of the vehicle 10 related to hybrid drive control, for example. The electronic control device 80 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 80 provides the output control of the engine 14, the drive control of the electric motor MG including regenerative control of the electric motor MG, the shift control of the automatic transmission 18, torque capacity control of the connecting/disconnecting clutch K0, the engagement/release control of the lockup clutch 38, etc., and is configured separately as needed for engine control, electric motor control, hydraulic control, etc. The electronic control device 80 is supplied with each of various signals (e.g., an engine rotation speed Ne that is the rotation speed of the engine 14, a turbine rotation speed Nt, i.e., a transmission input rotation speed Nin that is a rotation speed of the transmission input shaft 36, a transmission output rotation speed Nout that is a rotation speed of the transmission output shaft 24 corresponding to the vehicle speed V, an electric motor rotation speed Nm that is a rotation speed of the electric motor MG, an accelerator opening degree Acc corresponding to a drive request amount to the vehicle 10 from a driver, a throttle valve opening degree θth of an electronic throttle valve, a battery temperature THbat, a battery input/output current (a battery charging/discharging current) that, a battery voltage Vbat, and a state of charge (charge capacity) SOC of the electric storage device 54, and a cooling water temperature THeng that is temperature of cooling water of the engine 14 corresponding to temperature of the engine 14 itself or engine oil) based on detection values from various sensors (e.g., an engine rotation speed sensor 56, a turbine rotation speed sensor 58, an output shaft rotation speed sensor 60, an electric motor rotation speed sensor 62, an accelerator opening degree sensor 64, a throttle sensor 66, a battery sensor 68, and a cooling water temperature sensor 70). The electronic control device 80 outputs, for example, an engine output control command signal Se for the output control of the engine 14, an electric motor control command signal Sm for controlling the operation of the electric motor MG, and an oil pressure command signal Sp for actuating an electromagnetic valve (solenoid valve) etc. included in the hydraulic control circuit 50 for controlling the hydraulic actuators of the connecting/disconnecting clutch K0, the lockup clutch 38, and the clutches C and the brakes B of the automatic transmission 18, to engine control devices such as a throttle actuator and a fuel supply device, the inverter 52, and the hydraulic control circuit 50, respectively.

Figure 2:
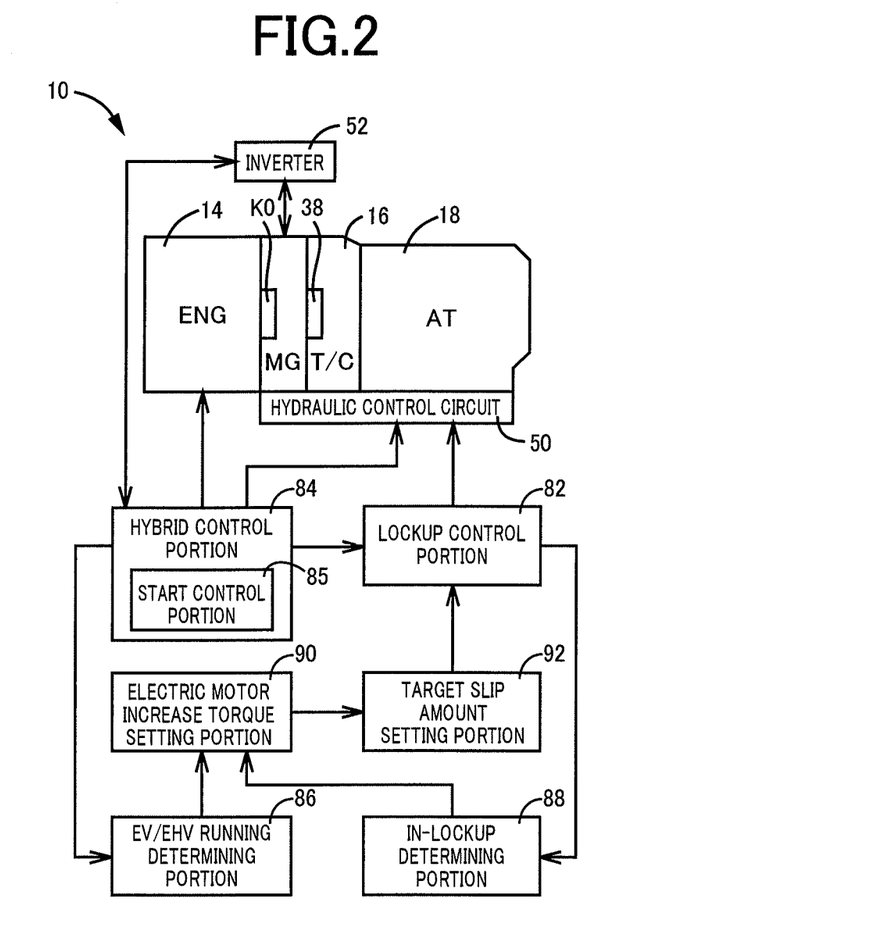
FIG. 2 is a functional block diagram for explaining a main portion of a control function of an electronic control device.
Figure 3:
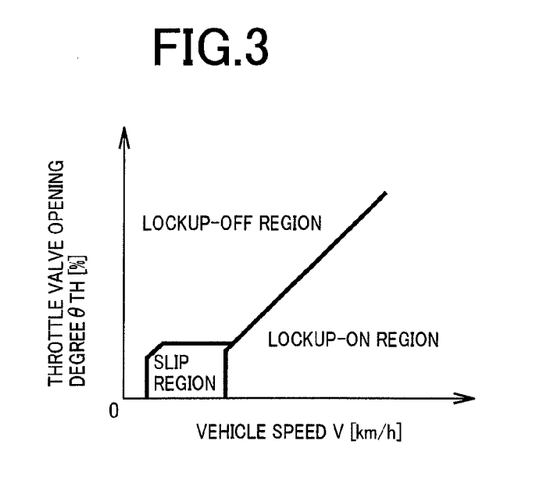
FIG. 3 is a diagram of an example of a lockup region diagram used for controlling the lockup clutch.

FIG. 2 is a functional block diagram for explaining a main portion of a control function of the electronic control device 80. In FIG. 2, a lockup control means, i.e., a lockup control portion 82 controls switching of the actuation state of the lockup clutch 38 based on a vehicle state indicated by the actual vehicle speed V and throttle valve opening degree θth from a preliminarily obtained and stored (i.e., predefined) relationship (a map, a lockup region diagram) having a lockup-off region in which the lockup clutch 38 is released, a slip region in which the lockup clutch 38 is slip-engaged, and a lockup-on region in which the lockup clutch 38 is completely engaged (i.e., the lockup clutch 38 is engaged without a slip, which is the same meaning as engaging the lockup clutch 38) in two-dimensional coordinates using the vehicle speed V and the throttle valve opening degree θth as variables as depicted in FIG. 3, for example. The lockup control portion 82 determines an actuation state of the lockup clutch 38 to be controlled based on the actual vehicle state from the lockup region diagram and outputs to the hydraulic control circuit 50 a command value (LU command pressure) Slu of an engagement oil pressure (lockup clutch pressure) of the lockup clutch 38 for switching to the determined actuation state. This LU command pressure Slu is one of the oil pressure command signals Sp.

A hybrid control means, i.e., a hybrid control portion 84, has a function as an engine drive control portion controlling drive of the engine 14 and a function as an electric motor operation control portion controlling the operation of the electric motor MG as a drive force source or an electric generator through the inverter 52, and provides the hybrid drive control by the engine 14 and the electric motor MG through these control functions. For example, the hybrid control portion 84 calculates a request drive torque Touttgt as a drive request amount (i.e. a driver request amount) to the vehicle 10 from a driver based on the accelerator opening degree Acc and the vehicle speed V and controls the drive force source for running so as to achieve output torque of the drive force source for running (the engine 14 and the electric motor MG) such that the request drive torque Touttgt is acquired in consideration of a transmission loss, an accessory load, a gear stage of the automatic transmission 18, the charge capacity SOC of the electric storage device 54, etc. The drive request amount can be implemented by using not only the request drive torque Touttgt [Nm] at the drive wheels 34 but also a request drive force [N] at the drive wheels 34, a request drive power [W] at the drive wheels 34, a request transmission output torque at the transmission output shaft 24, a request transmission input torque at the transmission input shaft 36, a target torque of the drive force source for running (the engine 14 and the electric motor MG), etc. The drive request amount can be implemented by simply using the accelerator opening degree Acc [%], the throttle valve opening degree θth [%], an intake air amount [g/sec] of the engine 14, etc.

Specifically, for example, if the request drive torque Touttgt is within a range that can be covered solely by an output torque (electric motor torque) Tm of the electric motor MG, the hybrid control portion 84 sets a running mode to a motor running mode (hereinafter, EV mode) and performs motor running (EV running) using only the electric motor MG as the drive force source for running. On the other hand, for example, if the request drive torque Touttgt is within a range that cannot be covered unless at least an output torque (engine torque) Te of the engine 14 is used, the hybrid control portion 84 sets the running mode to an engine running mode, i.e., a hybrid running mode (hereinafter, EHV mode), and performs engine running, i.e., hybrid running (EHV running), using at least the engine 14 as the drive force source for running.

Figure 4:
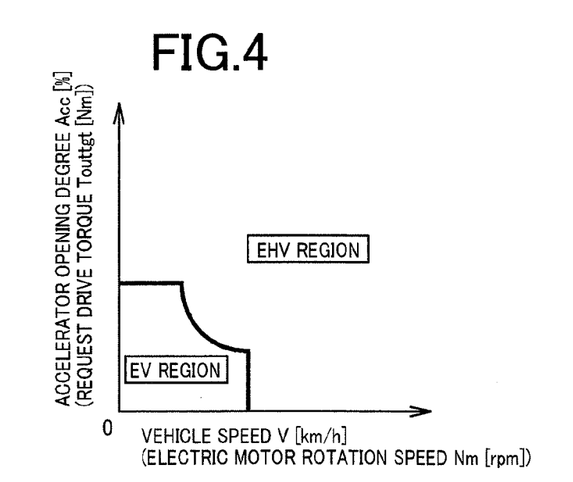
FIG. 4 is a diagram of an example of an EV/EHV region map used for switching between an EV running and an engine running.

FIG. 4 is a diagram of a relationship (EV/EHV region map) having an EV-EHV switch line dividing a region into a motor running region (EV region) and an engine running region (EHV region) defined in advance in two-dimensional coordinates using the vehicle speed V and the drive request amount (e.g., the accelerator opening degree Acc) as variables. The hybrid control portion 84 performs the EV running if the vehicle state (e.g., the actual vehicle speed V and accelerator opening degree Acc) is within the EV region, for example, and performs the EHV running if the vehicle state is within the EHV region, for example. Although the EV-EHV switch line in the EV/EHV region map of FIG. 4 is represented as a line for convenience, the line is a series of points represented by a vehicle state in terms of control. The EV-EHV switch line desirably includes an EV-to-EHV switch line at the time of transition from the EV range to the EHV region and an EHV-to-EV switch line at the time of transition from the EHV region to the EV region so that hysteresis is included.

If the EV running is performed, the hybrid control portion 84 releases the connecting/disconnecting clutch K0 to interrupt a power transmission path between the engine 14 and the torque converter 16 and causes the electric motor MG to output the electric motor torque Tm required for the EV running. On the other hand, if the EHV running is performed, the hybrid control portion 84 engages the connecting/disconnecting clutch K0 to connect the power transmission path between the engine 14 and the torque converter 16 and causes the engine 14 to output the engine torque Te required for the EHV running while causing the electric motor MG to output the electric motor torque Tm as an assist torque as needed.

For example, if a transition of the vehicle state is made from the EV region to the EHV region during the EV running or if the charge capacity SOC of the electric storage device 54 falls below a predetermined capacity defined in advance, the hybrid control portion 84 considers that an engine start request is made, switches the running mode from the EV mode to the EHV mode, and starts the engine 14 to perform the EHV running.

The hybrid control portion 84 includes a start control means, i.e., a start control portion 85, starting the engine 14, and the start control portion 85 includes a first start control portion starting the engine 14 by using only the electric motor MG and a second start control portion starting the engine 14 by secondarily using the electric motor MG, for example.

In a first start method of starting the engine 14 by the first start control portion, for example, the engine is started while the connecting/disconnecting clutch K0 is controlled toward engagement (from another viewpoint, while the engine 14 is rotationally driven by the electric motor MG). Specifically, the hybrid control portion 84 outputs a command value (K0 command pressure) of an engagement oil pressure (K0 clutch pressure) of the connecting/disconnecting clutch K0 so as to acquire a K0 transmission torque Tk (corresponding to a torque capacity of the connecting/disconnecting clutch K0) for transmitting an engine start torque Tms that is a torque required for the engine start toward the engine 14, thereby raising the engine rotation speed Ne. When it is determined that the engine rotation speed Ne is raised to a predetermined rotation speed enabling a complete explosion, the hybrid control portion 84 starts the engine 14 by initiating engine ignition, fuel supply, etc.

In a second start method of starting the engine 14 by the second start control portion, for example, the engine is started by the starter motor 40. If the second start method is used, an insufficient torque for starting the engine 14 in the case of using only the second start method is transmitted as the engine start torque Tms toward the engine 14. Therefore, if the second start method is used, the engine start torque Tms going through the connecting/disconnecting clutch K0 toward the engine 14 is made smaller as compared to when the first start method is used.

Since the engine start torque Tms corresponds to the electric motor torque Tm going through the connecting/disconnecting clutch K0 toward the engine 14, the electric motor torque Tm going toward the drive wheels 34 is accordingly reduced. Therefore, at the start of the engine 14, the hybrid control portion 84 increases the electric motor torque Tm by the engine start torque Tms as compared to the electric motor torque Tm during the EV running so as to suppress a drop in a drive torque Tout. In other words, when starting the engine 14, the hybrid control portion 84 outputs to the inverter 52 a command for outputting the electric motor torque Tm of the magnitude acquired by adding the electric motor torque Tm corresponding to the engine start torque Tms to the electric motor torque Tm during the EV running. The electric motor torque Tm increased at the start of the engine 14 (hereinafter referred to as an electric motor increase torque Tmup at the engine start) is an electric motor compensation torque (or an electric motor torque compensation amount; MG compensation amount) in torque compensation for compensating a drop in the drive torque Tout at the engine start by the electric motor MG (i.e., compensating the K0 transmission torque Tk). The electric motor increase torque Tmup at the engine start is determined as a torque corresponding to a K0 transmission torque Tk (hereinafter, i.e., the engine start torque Tms) estimated from the K0 command pressure, for example.

The actual K0 transmission torque Tk (hereinafter referred to as an actual K0 transmission torque Tk) may not correctly be estimated from the K0 command pressure due to variations of components and variations of control (e.g., change in friction coefficient of the connecting/disconnecting clutch K0 and variations of responsiveness). As a result, a gap may occur in rising timing or absolute value between the actual electric motor increase torque Tmup and the actual K0 transmission torque Tk and the drive torque Tout may vary, resulting in a shock at the engine start (engine start shock). Particularly when the lockup clutch 38 is engaged, torque variation at the engine start is difficult to suppress as compared to when the lockup clutch 38 is slip-engaged or released, and the engine start shock significantly occurs.

Therefore, when the engine 14 is started by controlling the connecting/disconnecting clutch K0 toward engagement during the EV running with the connecting/disconnecting clutch K0 released and the lockup clutch 38 engaged without a slip, the hybrid control portion 84 increases the electric motor torque Tm while the lockup control portion 82 temporarily slip-engages the lockup clutch 38, so as to suppress the engine start shock. If the engine start is completed by the hybrid control portion 84, the lockup control portion 82 engages the lockup clutch 38.

If the lockup clutch 38 is slip-engaged, fuel efficiency may deteriorate due to a fluid loss of the torque converter 16 or drivability may decrease because of the time required until subsequent reengagement of the lockup clutch 38. Such a problem more significantly appears when a slip amount of the lockup clutch 38 (hereinafter referred to as an L/U slip amount Ns (=Nm-Nt)) is larger. Therefore, if the large L/U slip amount Ns is uniformly set in expectation of a certain gap between the electric motor increase torque Tmup and the actual K0 transmission torque Tk, fuel efficiency may deteriorate or drivability may decrease all the time. Balance must be achieved between the suppression of the engine start shock and the suppression of deterioration in fuel efficiency or decrease in drivability.

In this example, it was found that when the electric motor increase torque Tmup is smaller, a larger gap hardly occurs in the rising timing or the absolute value between the actual electric motor increase torque Tmup and the actual K0 transmission torque Tk as compared to when the electric motor increase torque Tmup is larger. Therefore, when the electric motor increase torque Tmup is larger at the start of the engine 14, the electronic control device 80 of this example makes the L/U slip amount Ns larger as compared to when the electric motor increase torque Tmup is smaller.

More specifically, returning to FIG. 2, an EV/EHV running determining means, i.e., an EV/EHV running determining portion 86 determines where the vehicle 10 is during the EV running based on a control operation by the hybrid control portion 84, for example.

An in-lockup determining means, i.e., an in-lockup determining portion 88 determines whether the lockup clutch 38 is in engagement (i.e., in lockup) based on the control operation by the lockup control portion 82, for example.

If the EV/EHV running determining portion 86 determines that the vehicle is during the EV running and the in-lockup determining portion 88 determines that the clutch is in lockup, an electric motor increase torque setting means, i.e., an electric motor increase torque setting portion 90 determines the electric motor increase torque Tmup. For example, if the next engine start is performed with the first start method, the electric motor increase torque setting portion 90 determines as the electric motor increase torque Tmup a basic electric motor increase torque Tmupb corresponding to the K0 transmission torque Tk predefined as a torque required at the engine start with the first start method. If a friction torque of the engine 14 (a compression torque corresponding to pumping loss+a mechanical friction torque corresponding to sliding friction) varies, the electric motor increase torque Tmup must be changed. In particular, when the temperature of engine oil is lower, the friction torque tends to be larger as compared to when the temperature is higher and, therefore, the electric motor increase torque Tmup is made larger. Specifically, if the actual cooling water temperature THeng is lower than the cooling water temperature THeng assumed at the basic electric motor increase torque Tmup, the electric motor increase torque setting portion 90 determines a torque value larger than the basic electric motor increase torque Tmupb as the electric motor increase torque Tmup. On the other hand, if the actual cooling water temperature THeng is higher than the cooling water temperature THeng assumed at the basic electric motor increase torque Tmup, the electric motor increase torque setting portion 90 determines a torque value smaller than the basic electric motor increase torque Tmupb as the electric motor increase torque Tmup.

If the next engine start is performed with the second start method, the electric motor increase torque setting portion 90 determines as the electric motor increase torque Tmup a second basic electric motor increase torque Tmupb2 corresponding to the K0 transmission torque Tk predefined as a torque required at the engine start with the second start method. If the engine start is performed with the second start method, the engine start torque Tms is made smaller as compared to the first start method as described above and, therefore, the second basic electric motor increase torque Tmupb2 is made smaller than the basic electric motor increase torque Tmupb. In the case of the second start method, as is the case with the first start method, the electric motor increase torque Tmup may be changed based on the cooling water temperature THeng. If the second start method is the engine start using the starter motor 40, it is determined whether the next engine start using the starter motor 40 is possible based on whether a predetermined condition for an elapsed time from the previous operation of the starter motor 40, the number of times of operation of the starter motor 40 during one trip after turning on of ignition of the vehicle 10, the charge capacity SOC of the electric storage device 54, etc is satisfied that is predefined in consideration of durability and operational characteristics of the starter motor 40. If it is determined that the next engine start using the starter motor 40 is possible, the next engine start is performed with the second start method in preference to the first start method. Alternatively, the engine start using the starter motor 40 may be limitedly performed if the actual cooling water temperature THeng is in a predefined extremely-low temperature region in which the friction torque becomes large.

Other factors causing a change in the electric motor increase torque Tmup will hereinafter briefly be described. For example, when the automatic transmission 18 is at a higher gear stage, it is contemplated that the engine start shock is more hardly felt and, therefore, the electric motor increase torque Tmup may be made smaller for fuel efficiency improvement. When a climb gradient of the engine rotation speed Ne at the engine start is larger, the electric motor increase torque Tmup is made larger as compared to when the climb gradient is smaller. Specifically, in the case of the engine start attributable to a reduction in the charge capacity SOC of the electric storage device 54, the climb gradient of the engine rotation speed Ne may be made smaller; however, in the case of the engine start attributable to an increase in the accelerator opening degree Acc, the climb gradient of the engine rotation speed Ne is made larger so as to improve the drivability.

The second start method may be so-called ignition start in which the engine 14 is started by injecting and exploding (igniting) fuel in a predetermined cylinder (e.g., cylinder in an expansion stroke) out of a plurality of cylinders of the engine 14 during stop of rotation or not in operation, for example. It is determined whether the next engine start can be performed as the ignition start in the cylinder located in the expansion stroke of the engine 14, based on whether an actual crank angle Acr is within a predetermined crank angle range predefined as a crank angle range for properly performing the ignition start. Since the friction torque of the engine 14 at the engine start varies depending on the crank angle Acr when the rotation of the engine 14 is stopped, the electric motor increase torque Tmup may be changed based on the crank angle Acr in the ignition start.

Figure 5:
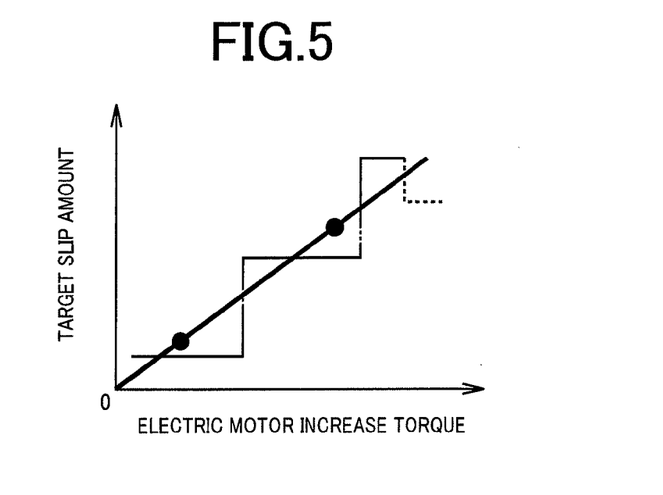
FIG. 5 is a diagram of an example of a target slip amount map used for determining a target slip amount.

If the EV/EHV running determining portion 86 determines that the vehicle is during the EV running and the in-lockup determining portion 88 determines that the clutch is in lockup, a target slip amount setting means, i.e., a target slip amount setting portion 92 determines a target value of the L/U slip amount Ns (hereinafter referred to as a target slip amount Nstgt) based on the electric motor increase torque Tmup determined by the electric motor increase torque setting portion 90. The target slip amount setting portion 92 determines the target slip amount Nstgt based on the electric motor increase torque Tmup from a predefined relationship (target slip amount map) between the electric motor increase torque Tmup and the target slip amount Nstgt as indicated by a solid line of FIG. 5, for example. In FIG. 5, as indicated by the solid line, when the electric motor increase torque Tmup is larger, the L/U slip amount Ns is made larger as compared to when the torque Tmup is smaller. Although the solid line indicates a characteristic linearly changing upward to the right, a characteristic changing stepwise upward to the right as indicated by a dashed-two dotted line may be used as the target slip amount map instead of the solid line. Alternatively, a characteristic changing in at least two stages as indicated by black points may be used as the target slip amount map. In this case, for example, the electric motor increase torque Tmup is handled as the electric motor increase torque Tmup of the nearest point. As indicated by a broken line, a characteristic changing stepwise downward to the right may also be available. In short, any relationship is available as long as the L/U slip amount Ns is made larger when the electric motor increase torque Tmup is larger as compared to when the torque Tmup is smaller.

Figure 6:
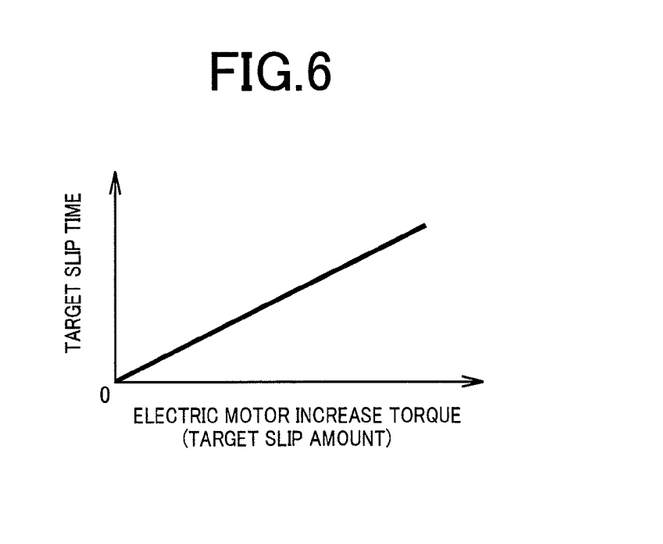
FIG. 6 is a diagram of an example of a target slip time map used for determining a target slip time.

When the lockup clutch 38 is temporarily slip-engaged by the lockup control portion 82 at the determined L/U slip amount Ns, the control time may be constant or the control time may be changed. The target slip amount setting portion 92 determines a target slip time Tstgt based on the electric motor increase torque Tmup (or the target slip amount Nstgt) from a predefined relationship (target slip time map) between the electric motor increase torque Tmup (or the target slip amount Nstgt) and the target slip time Tstgt as depicted in FIG. 6, for example. In FIG. 6, for example, from the viewpoint that a control amount becomes larger when the target slip amount Nstgt is larger, the target slip time Tstgt is made larger when the electric motor increase torque Tmup (or the target slip amount Nstgt) is larger, as compared to when the torque Tmup (or the amount Nstgt) is smaller.

Figure 7:
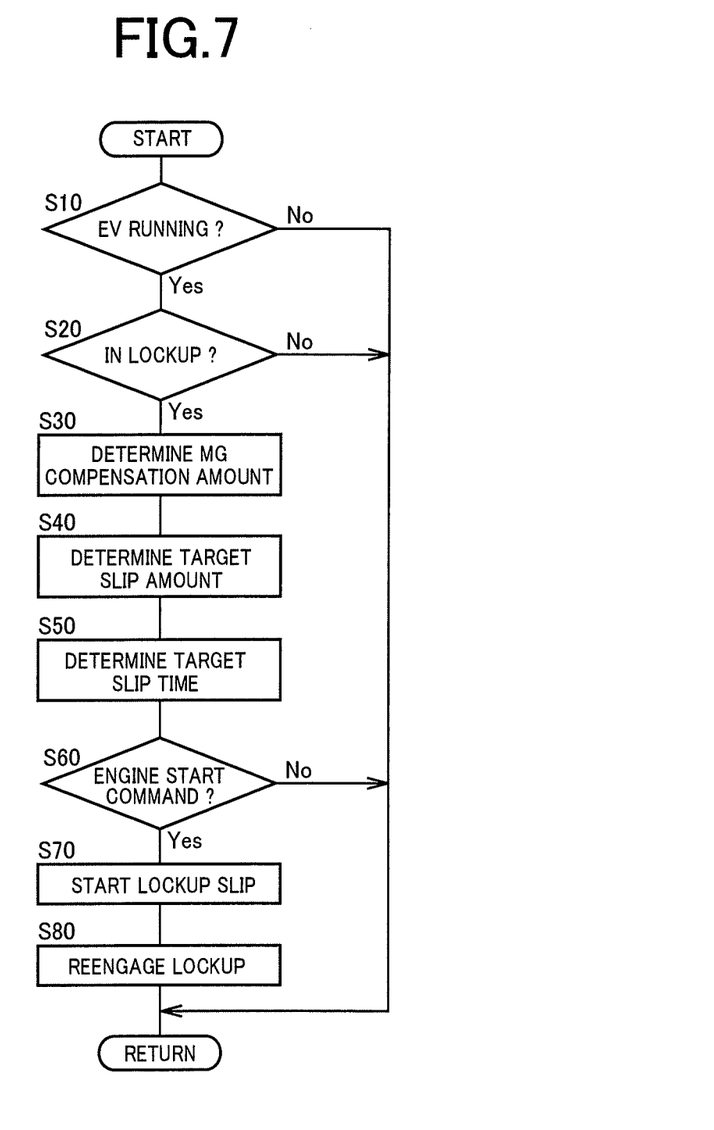
FIG. 7 is a flowchart for explaining a main portion of a control operation of the electronic control device, i.e., the control operation for satisfying both the suppression of the engine start shock and the improvement in fuel efficiency or drivability when the engine is started by controlling a connecting/disconnecting clutch toward engagement during the EV running with the connecting/disconnecting clutch released and the lockup clutch engaged.
Figure 8:
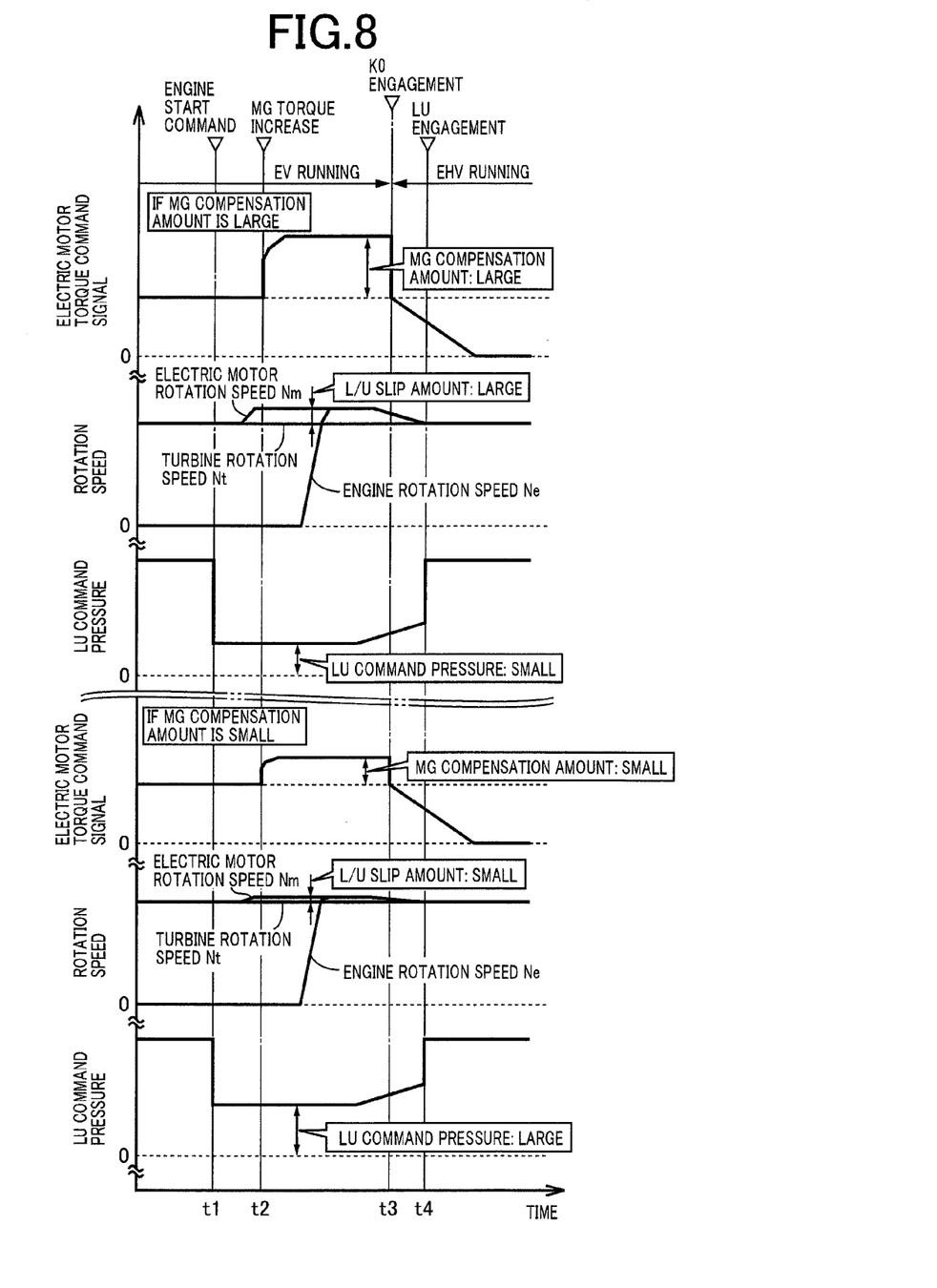
FIG. 8 is a time chart when the control operation depicted in the flowchart of FIG. 7 is executed.

FIG. 7 is a flowchart for explaining a main portion of a control operation of the electronic control device 80, i.e., the control operation for satisfying both the suppression of the engine start shock and the improvement in fuel efficiency or drivability when the engine 14 is started by controlling the connecting/disconnecting clutch K0 toward engagement during the EV running with the connecting/disconnecting clutch K0 released and the lockup clutch 38 engaged, and is repeatedly executed with an extremely short cycle time, for example, on the order of a few msec to a few tens of msec. FIG. 8 is a time chart when the control operation depicted in the flowchart of FIG. 7 is executed.

In FIG. 7, first, at step (hereinafter, step will be omitted) S10 corresponding to the EV/EHV running determining portion 86, it is determined whether the vehicle 10 is during the EV running, for example. If the determination of S10 is negative, this routine is terminated and, if affirmative, it is determined at S20 corresponding to the in-lockup determining portion 88 whether the lockup clutch 38 is in lockup. If the determination of S20 is negative, this routine is termi-nated and, if affirmative, at S30 corresponding to the electric motor increase torque setting portion 90, the electric motor increase torque Tmup (MG compensation amount) is determined based on the start method used for the engine start, the cooling water temperature THeng, etc. (before time t1 of FIG. 8). At S40 corresponding to the target slip amount setting portion 92, the target slip amount Nstgt is determined based on the electric motor increase torque Tmup determined at S30 from the target slip amount map as depicted in FIG. 5, for example (before time t1 of FIG. 8). At S50 corresponding to the target slip amount setting portion 92, the target slip time Tstgt is determined based on the target slip amount Nstgt determined at S40 from the target slip time map as depicted in FIG. 6, for example (before time t1 of FIG. 8). At S60 corresponding to the hybrid control portion 84, it is determined whether an engine start request is made, based on whether a transition of the vehicle state is made from the EV region to the EHV region during the motor running, or whether the charge capacity SOC of the electric storage device 54 falls below a predetermined capacity defined in advance. If it is determined that an engine start request is made, the hybrid control portion 84 outputs an engine start command (time t1 of FIG. 8). S60 can be considered as step of determining whether the engine start command is output. If the determination of S60 is negative, this routine is terminated and, if affirmative, at S70 corresponding to the lockup control portion 82, lockup slip control is started to temporarily slip-engage the lockup clutch 38 with the L/U slip amount Ns determined at S40 and the target slip time Tstgt determined at S50 (from time t1 to time t4 of FIG. 8). At S80 corresponding to the lockup control portion 82, the lockup clutch 38 is reengaged after completion of the engine start (time t4 of FIG. 8).

The time chart of FIG. 8 represents an example of the case that the engine 14 is started during the EV running with the lockup clutch 38 engaged, for example. The upper section of FIG. 8 depicts an example when the MG compensation amount is larger and the lower section is an example when the MG compensation amount is smaller. The both examples are for the purpose of comparison between the cases of different magnitudes of the MG compensation amount at the engine start under the running state set to the same vehicle speed V and the same gear stage, for example. As depicted in FIG. 8, at the engine start, when the MG compensation amount (an increase in an electric motor torque command signal value) is smaller, the LU command pressure is made larger and the L/U slip amount Ns is made smaller as compared to when the MG compensation amount is larger.

As described above, according to this example, although when the electric motor increase torque Tmup is larger at the start of the engine 14, a larger gap tends to occur in rising timing or absolute value between the actual electric motor increase torque Tmup and the actual K0 transmission torque Tk and the engine start shock generated due to the gap becomes larger as compared to when the torque Tmup is smaller, the L/U slip amount Ns is made larger to suppress the occurrence of the engine start shock. On the other hand, when the electric motor increase torque Tmup is relatively smaller, since a larger gap hardly occurs in rising timing or absolute value between the actual electric motor increase torque Tmup and the actual K0 transmission torque Tk and, even if the gap occurs, the generated engine start shock is originally smaller, the L/U slip amount Ns can be made relatively smaller to ensure fuel efficiency or drivability. Therefore, when the engine is started by controlling the connecting/disconnecting clutch K0 toward engagement during the EV running with the connecting/disconnecting clutch K0 released and the lockup clutch 38 engaged, both the suppression of the engine start shock and the improvement in fuel efficiency or drivability can be satisfied.

According to this example, since the torque converter 16 transmits power even if the lockup clutch 38 is caused to slip, a reduction in drive force is suppressed even if the L/U slip amount Ns is made larger at the engine start. Therefore, as compared to uniformly setting the L/U slip amount Ns at the engine start, both the suppression of the engine start shock and the improvement in fuel efficiency or drivability can effectively be satisfied.

According to this example, if the second start method is used for the engine start, since the generated engine start shock is originally made smaller and the L/U slip amount Ns is made relatively smaller, fuel efficiency and drivability are ensured. Since the engine 14 is started after certainly determining whether the starter motor 40 is used for the engine start based on the cooling water temperature THeng, the charge capacity SOC, the number of times of operation, etc., the engine start shock is not deteriorated by making the L/U slip amount Ns smaller. Alternatively, since the engine 14 is started after certainly determining whether the engine start can be performed by the ignition start based on the crank angle Acr during stop of the engine rotation etc., the engine start shock is not deteriorated by making the L/U slip amount Ns smaller.

Although the example of the present invention has been described in detail with reference to the drawings, the present invention is applied in other forms.

For example, although the lockup clutch 38 is exemplarily illustrated as the second clutch capable of achieving the mechanically directly-coupled state of the power transmission path between the engine 14/the electric motor MG and the drive wheels 34 in the example, this is not a limitation. For example, even when the second clutch is an engagement device such as the clutches C and the brakes B of the automatic transmission 18, the present invention is applicable. In such a case, at the engine start during the EV running with the engagement device of the automatic transmission 18 engaged, both the suppression of engine start shock and the improvement in fuel efficiency or drivability can be satisfied. Therefore, the torque converter 16 may not necessarily include the lockup clutch 38. Another fluid transmission device such as a fluid coupling without a torque amplification effect may be used instead of the torque converter 16. The torque converter 16 and the automatic transmission 18 may not necessarily be included. In short, the present invention is applicable to any vehicle disposed with a clutch connecting/disconnecting the power transmission path as the second clutch capable of achieving the mechanically directly-coupled state of the power transmission path between the engine 14/the electric motor MG and the drive wheels 34.

Although the engine 14 is started by secondarily using the electric motor MG in the second start method in the example, the engine start can be performed without an assist from the electric motor MG in some cases. In these cases, the electric motor increase torque Tmup is zero. Therefore, the concept of a smaller electric motor increase torque Tmup includes the concept that the electric motor increase torque Tmup is zero. As depicted in FIG. 5, when the electric motor increase torque Tmup is zero, the target slip amount Nstgt is zero and the actual L/U slip amount Ns is also zero.

Although the vehicle 10 includes the starter motor 40 in the example, the starter motor 40 may not necessarily be included. Although the vehicle 10 enables the ignition start as the start method of the engine 14, a vehicle may be unable to perform the ignition start. Therefore, the vehicle 10 may not include the second start method as a start method of the engine 14. If only the first start method is included, the electric motor increase torque Tmup changes due to the cooling water temperature THeng and the gear stage of the automatic transmission 18, for example, and therefore, the present invention is applicable. Contrarily, even if only the second start method is included, the present invention is obviously applicable.

The above description is merely an embodiment and the present invention can be implemented in variously modified and improved forms based on the knowledge of those skilled in the art.

NOMENCLATURE OF ELEMENTS

10: vehicle
14: engine
16: torque converter (fluid transmission device)
16a: pump impeller (input-side rotating member)
16b: turbine impeller (output-side rotating member)
18: automatic transmission
34: drive wheels
38: lockup clutch (second clutch)
40: starter motor
80: electronic control device (control device)
85: start control portion
92: target slip amount setting portion
MG: electric motor
K0: engine connecting/disconnecting clutch (first clutch)
C: clutch (engagement device, second clutch)
B: brake (engagement device, second clutch)

The invention claimed is:

1. A control device of a vehicle including an engine, an electric motor, and a first clutch connecting/disconnecting a power transmission path between the engine and the electric motor, and a second clutch configured to achieve a mechanically directly-coupled state of a power transmission path between the engine/the electric motor and drive wheels, the control device of a vehicle increasing a torque of the electric motor and causing the second clutch to slip-engage when the engine is started by controlling the first clutch toward engagement during motor running using only the electric motor as a drive force source for running with the first clutch released and the second clutch engaged, when an increased amount the torque of the electric motor increased at the start of the engine is made larger relative to the torque of the electric motor during the motor running, a slip amount of the second clutch is made larger as compared to when the increased amount of the torque is smaller.

2. The control device of a vehicle of claim 1, wherein
a fluid transmission device is disposed in the power transmission path between the engine/the electric motor and the drive wheels, and wherein
the second clutch is a lockup clutch configured to directly couple an input-side rotating member and an output-side rotating member of the fluid transmission device.

3. The control device of a vehicle of claim 1, wherein
an automatic transmission is disposed that makes up a portion of the power transmission path between the electric motor and the drive wheels, and wherein
the second clutch is an engagement device included in the automatic transmission.

4. The control device of a vehicle of claim 1, wherein
a starter motor cranking the engine is further included, and wherein when the starter motor is used at the start of the engine, the torque of the electric motor increased at the start of the engine is made smaller as compared to when the starter motor is not used.

5. The control device of a vehicle of claim 1, wherein a start control portion is further included that injects and explodes fuel in a cylinder of the engine during stop of rotation to start the engine, and wherein when an engine start is performed by the start control portion at the start of the engine, the torque of the electric motor increased at the start of the engine is made smaller as compared to when the engine start is not performed by the start control portion.

6. The control device of a vehicle of claim 1, wherein the control device is configured to determine a target slip amount of the second clutch based on the increased amount of the torque of the electric motor and a predefined relationship so as to cause the second clutch to slip-engage.

* * * * *